United States Patent
Ridderheim et al.

(10) Patent No.: US 6,986,153 B1
(45) Date of Patent: Jan. 10, 2006

(54) APPARATUS AND METHOD FOR INSERTION OF MATERIAL IN BROADCASTING

(75) Inventors: Stefan Ridderheim, Sundsvall (SE); Atma Heerah, Cambridge (GB)

(73) Assignee: Pinnacle Systems, Inc., Mountain View, CA (US)

( * ) Notice: Subject to any disclaimer, the term of this patent is extended or adjusted under 35 U.S.C. 154(b) by 0 days.

(21) Appl. No.: 09/499,609

(22) Filed: Feb. 7, 2000

Related U.S. Application Data (63) Continuation-in-part of application No. 08/809,872, filed as application No. PCT/SE95/01056 on Sep. 18, 1995, now abandoned.

(30) Foreign Application Priority Data

Sep. 16, 1994 (SE) .................................. 9403109

(51) Int. Cl.
   *H04N 7/10* (2006.01)
(52) U.S. Cl. .......................................... 725/32; 725/36
(58) Field of Classification Search ................ 725/32, 725/22, 35, 36; 348/473, 476, 478, 722
   See application file for complete search history.

(56) References Cited

U.S. PATENT DOCUMENTS

| | | | | |
|---|---|---|---|---|
| 4,625,235 A | * | 11/1986 | Watson | 348/476 |
| 4,638,359 A | * | 1/1987 | Watson | 348/460 |
| 4,928,177 A | * | 5/1990 | Martinez | 725/121 |
| 4,956,709 A | * | 9/1990 | Richer et al. | 348/466 |
| 5,099,319 A | * | 3/1992 | Esch et al. | 725/36 |
| 5,412,416 A | * | 5/1995 | Nemirofsky | 725/36 |
| 5,424,770 A | * | 6/1995 | Schmelzer et al. | 725/36 |

* cited by examiner

*Primary Examiner*—Victor R. Kostak
(74) *Attorney, Agent, or Firm*—Schneck & Schneck; Thomas Schneck; Nissa M. Strottman

(57) ABSTRACT

A system, apparatus, and method for local insertion of analog or digital material into a television broadcast signal. A central insertion control unit controls the insertion of additional material while a remote insertion control unit locally controls the insertion of the additional material. The central insertion control unit contains a processor, storage media, and an encoder for encoding control and information signals into a broadcast signal. The control signal contains a cue signal for information about play lists, and an action signal for triggering insertion of the additional material. The control signal is encoded into a line of the vertical blanking interval. Once the control is detected by the remote insertion control unit the additional material is played and broadcast.

80 Claims, 6 Drawing Sheets

APPARATUS AND METHOD FOR INSERTION OF MATERIAL IN BROADCASTING

This is a continuation-in-part of application Ser. No. 08/809,872, filed Jul. 14, 1997, now abandoned, which is a 371 of application Ser. No. PCT/SE95/01056, filed Sep. 18, 1995.

BACKGROUND OF THE INVENTION

I. Field of the Invention

The present invention relates to an apparatus and method for local inserting analog or digital material, such as an audio-video advertisement, into analog or digital broadcast signal. More specifically, the present invention relates to a novel method and system for inserting additional material into a multimedia or television ("TV") channel signal being broadcast from a central source and received by a remote receiver adapted for rebroadcasting the television signal to a number of end viewer units. This application claims the benefit of priority to Swedish Application No. 94 03109-3, filed Sep. 16, 1994, and is a continuation-in-part of U.S. patent application Ser. No. 08/809,872, entitled "Apparatus and Method for Local Insertion of Material in Broadcasting," filed Jul. 14, 1997, which is a 371 of PCT/SE95/01056, filed Sep. 18, 1995.

II. Description of the Related Art

Advertising in media broadcasting has traditionally been an exclusive field for large companies on national or multinational level. The reasons for this exclusivity are due to the high production cost for commercials and, perhaps above all, the fact that a very large number of consumers view a broadcast, thus motivating a high price per broadcast commercial. However, in the rapidly changing field of media broadcasting, these factors are changing. Advertising production costs decline from year-to-year. Moreover, as rebroadcast systems, such as various radio and cable television channels, increase, the viewer groups fragment and segment themselves. Consequently, it is increasingly important, and possible, to target the limited consumer groups that are integrated geographically or by viewer interests.

Thus there is a need for a cost-effective and efficient system and method for inserting locally broadcast commercials into conveniently arranged slots in wide-area multimedia broadcast channels. Such a system and method would allow large companies to insert information about local dealers into centrally produced commercials or small companies to afford locally broadcast commercials into a medium which in practice has been previously closed to local advertisers.

Several advertising insertion systems have evolved from analog insertion systems. These systems include U.S. Pat. No. 4,724,491 entitled "Inserting Television Advertising Spots Automatically," issued to Lambert on Feb. 9, 1988, U.S. Pat. No. 5,060,068 entitled "Audio/video distribution system," issued to Lindstrom on Oct. 22, 1991, and WO 93/10630 issued to Keene, all incorporated herein by reference. These patents disclose systems that switch on video tape recorders, to play commercials, in response to cue in signals broadcast within the main television signal. Analog and partly mechanical systems present problems concerning the reliability of an advertisement segment segueing into the main television signal.

Similarly, other patents address the transmission of television signals to be inserted into a main television signal, and the monitoring and logging of additional signals that have been inserted and broadcast. These patents include U.S. Pat. No. 5,099,319, "Video Information Delivery Method and Apparatus," issued to Esch et al. on Oct. 23, 1999, and in the European patent application EP-A1-0 620 689, "Method and Apparatus for Automatic Insertion of a Television Signal from a Remote Source," filed Apr. 15, 1994 by Lambert, both incorporated herein by reference.

A digital insertion system is disclosed in WO 93/21732, "Digital Audio/Video Insertion System," filed Apr. 7, 1993 by Fasciano et al. Fasciano et al disclose a system comprising an apparatus for digitizing, compressing and storing audio/video source information, a playing apparatus for decompressing the source information and regenerating an analog signal, and a patching apparatus adapted to inset the regenerated analog signal into a broadcast channel. However, this system fails to solve the problem of reliably synchronizing and cueing additional signals into a broadcasting or other communication channel, and reliability in remote control of insertion apparatus. In particular, it is a problem to achieve a technical implementation that satisfies reliability requirements to a cost that is reasonable to a larger group of advertisement buyers.

Traditional cueing system are based on general-purpose interfaces (GPIs). These switch closure systems essentially have two states: "stop" and "go." The "go" state cues and plays a predetermined later time. By their very nature, these cueing systems lack accuracy, flexibility, reliability and security.

These cueing systems are not frame accurate which limits their use. The "stop" and "go" nature of their cue results in a 5–8 second delay. This delay has to be adjusted at the remote or headend site for each television network, resulting in burdensome overhead.

Moreover, standard solutions are schedule dependent, and thus less flexible. In other words, they rely heavily on schedules that are stored at the remote system. Consequently, such a system lacks flexibility, accuracy, and security. Last minute changes in a broadcast schedule made at the central site would have to be communicated to the remote site. For example, suppose an important news event broke while a children's cartoon was being broadcast. The broadcaster would need to update the commercial media shown during a news story, because it may not be appropriate to show child-oriented commercials during a news report. These updates required by cue-tone systems require high overhead in terms of communication time and human intervention. What is needed is a solution that eliminates this high overhead.

Conventional systems are unreliable. To solve for this problem, conventional systems use "time windows," which cancel commercial breaks if the commercial media is not played within a certain time window. The setting of these windows is often haphazard and requires additional human intervention to do the manual entry. The use of time windows is especially burdensome when a schedule changes quickly.

Another problem with standard cue-tone and general-purpose interface based systems are that they offer no inherent security for media channels or cable networks that deploy them. Video pirates can easily insert unauthorized materials during a commercial break. This is especially a problem for global satellite and cable channels that cannot, by their very nature, control and man remote sites in every country.

Thus there is a need for a cost-effective and efficient system and method for inserting locally broadcast commercials into conveniently arranged slots in wide-area broadcast media channels. Such a system and method would allow large companies to insert information about local dealers into centrally produced commercials or small companies to afford locally broadcast commercials into a medium which in practice has been previously closed to local advertisers, and reduce the high overhead required in conventional systems.

SUMMARY OF THE INVENTION

The overall object is to achieve an insertion system which allows a flexible and reliable remote control of insertion equipment and which provides reliable timing, cueing, synchronizing and playing of insertion material. A particular object is to provide such a system in a digital implementation, with a high degree of integration of functional units and at a low cost. Another object is to provide a system that utilizes existing broadcast system resources without interfering with other broadcast or communicated material, and is transparent to other system users.

In one embodiment of the invention, additional material (for example, commercials or any kind of programming) can be inserted into a media signal when the signal is being broadcast from a central source and received by a remote receiver adapted for rebroadcasting the media signal to a number of end user units. The system comprises a central insertion control unit and a remote insertion control unit. The central insertion control unit, as its name implies, centrally controls the insertion of the additional material. The central control unit connects to the broadcast equipment of the central source, and incorporates a control signal and an information signal into the television signal. The central control unit comprises storage media, a processor, an encoder, a data communications unit and a serial interface. The processor controls and monitors the insertion of the additional material, and is connected to the storage media, the encoder, and the data communications unit. The storage media stores control information as well as the additional material information and logging information. The encoder encodes the control and information signals into the broadcast television signal. The data communications unit and the serial interface connect to external devices adding flexibility to the overall system.

The remote insertion control unit locally controls the insertion of the additional material, by connecting to rebroadcasting equipment of the remote receiver. The remote insertion control unit receives the television signals and detects the control signals and information signals encoded within the television signals. Furthermore, the remote insertion control unit rebroadcasts the additional material in response to the control signal for a predefined time interval.

In a further aspect of the invention, multiple remote control units can be added. A first remote control unit, connected to the central insertion control unit, controls and communicates with the central insertion control unit. A second remote control unit, coupled to the remote insertion control unit, remotely controls and communicates with the first remote control unit. Communication with the first remote control unit and the central insertion control unit is performed via telecommunications lines, such as cable lines, antennas, or satellite links.

In such a system, the central insertion control unit operates in response to central playing schedule information. The remote insertion control can be coupled to remote storage media for storing additional material, play lists, log files and status information. The central insertion control unit, and the remote insertion control unit connect via telecommunications lines, and may use separately located compression and/or decompression units for compressing and/or decompressing information.

In another embodiment of the invention, the invention is comprised of a central insertion control unit and a remote insertion control unit.

The central insertion control unit controls the insertion of the additional material. The central control unit connects to the broadcast equipment of the central source, and incorporates a control signal and an information signal into the media signal. In this aspect of the invention, the central insertion control unit contains a processor, storage media, a player, a media signal switch, an insertion control unit, a computer interface, a data broadcast transceiver, and an audio-video changeover. All the devices are coupled to the processor via the computer interface. The storage media stores additional material used for inserting into broadcast signals. A player is used for playing the stored additional material. The television signal switch switches between rebroadcasting received media signals and the additional material being played by the player; the additional material is input into the switch as audio and video multimedia signals. The insertion control controls the switch depending upon a control signal extracted from the media signal. An audio-video changeover switches from a received television signal output to an insertion signal output from the player.

The remote insertion control unit locally controls the insertion of the additional material, by connecting to rebroadcasting equipment of the remote receiver. The remote insertion control unit receives the television signals and detects the control signals and information signals encoded within the television signals. Furthermore, the remote insertion control unit rebroadcasts the additional material in response to the control signal for a predefined time interval.

In an alternate embodiment of the invention, a central insertion control apparatus is comprised of a processor, storage media, an encoder, a data communications unit and a serial interface. The processor controls and monitors the insertion of the additional material, and is connected to the storage media, the encoder, and the data communications unit. The storage media stores control information as well as the additional material information and logging information. The data communications unit and the serial interface connect to external devices adding flexibility to the overall system. The encoder encodes the control and information signals into the broadcast media signal. In one embodiment, the encoder is a Teletext encoder for encoding the control signal into a Teletext compatible format transparent to a standard Teletext receiver. The control signals comprise a cue signal for transferring information about play lists and an action signal for triggering an insertion of a predefined segment of additional material. Encoding the control signal in a Hamming coded format adds greater reliability to the system. In an alternate aspect of the invention, the control signals contain a clock run in specification, a framing code, a data channel specification, a designation code, a security access code, a format signal, an action signal, a security code, a package identifier, and a magic number.

Other embodiments of the present invention include a central insertion control apparatus for inserting additional material into a TV channel television signal. Central insertion control units contain a processor, storage media and an encoder. The storage media stores the additional material. The encoder encodes the control and information signals into a broadcast television signal, inserting the control signal into a vertical-blanking interval of the media signal. In some embodiments, the control signal is inserted into a line of the vertical blanking interval, and the encoder is a Teletext encoder that encodes the control signal into a Teletext compatible format transparent to a standard Teletext receiver.

In a further aspect of the present invention, the apparatus further comprises a data communications unit and a serial interface. The data communications unit allows communication to external sites while the serial interface allows for connection to external devices. Both the data communications unit and the serial interface are coupled to the processor.

Control signals, in the form of controlling commands from the central insertion control unit are transferred through a telecommunications line. The telecommunications line may be of any kind known in the art, which includes a very small aperture terminal ("VSAT") line, integrated services digital network ("ISDN") line, and telephone or modem line.

The control signals may contain a cue signal and an action signal. The cue signal transfers information about play lists and an action signal triggers the insertion of a predefined segment of additional material. The control signals are preferably coded in a Hamming coded format.

In some embodiments, control signals may comprise a clock run in specification, a framing code, a data channel specification, a designation code, a security access code, a format signal, an action signal, a security code, a package identifier, and a magic number.

In a different embodiment of the present invention, a remote insertion control apparatus may be comprised of a processor, storage media, a player, a television signal switch and an insertion control unit. All of the devices are coupled to the processor. The storage media stores the additional material. The player takes the stored additional material and plays it. The television signal switch is for switching between rebroadcasting received television signals and the additional material being played by the player. The insertion control unit controls the television signal switch depending upon the video signal portion of the broadcast video signal. The insertion control unit is comprised of a computer interface, a data broadcast transceiver, and an audio/video changeover. The audio/video changeover and the data broadcast transceiver are coupled to the computer interface that is connected to the processor. The audio/video changeover switches from a received media signal output to an insertion signal output from the player.

In addition, the remote insertion control unit may also comprise genlocking circuits. Connected to the player, genlocking circuits take a broadcast video signal input and genlock its output signal to the received video signal.

In another embodiment of the present invention, a remote insertion control unit inserts additional material into a media signal being broadcast from a central source and received by a remote receiver. The remote insertion control unit contains a processor, storage media, a player, a television signal switch and an insertion control unit. All of the devices are coupled to the processor. The storage media stores the additional material. The player takes the stored additional material and plays it. The television signal switch for switching between rebroadcasting received television signals and the additional material being played by the player. The insertion control unit controls the television signal switch depending upon the video signal portion of the broadcast video signal. The insertion control unit is comprised of an input and a decoder. The input receives the video signal portion of a received television signal, from which a control signal is extractable; the decoder extracts the control signal from a vertical-blanking interval of the received television signal. The control signal may be extracted from a line of the vertical blanking interval. The decoder may contain a data receiver for decoding data transmitted via a vertical blanking interval of the television signal; the data receiver is connected to the processor via a computer interface. The data receiver may be a Teletext receiver.

In addition, the remote insertion control unit may also comprise genlocking circuits. Connected to the player, genlocking circuits take an input for receiving a broadcast video signal and genlock its output signal to the received video signal.

Also, an audio/video changeover may be coupled to the computer interface for switching from a received television signal output to an insertion signal output from the player.

Other aspects of the present invention include a method for insertion of additional material into a media signal being broadcast from a central source to a remote receiver. In these aspects of the present invention, control and information signals are encoded into a broadcast television signal and the control signals into a vertical-blanking interval of the broadcast television signal. A line of the vertical blanking interval may be selected for inserting a control signal. Different vertical blanking interval lines are allocated to different broadcast channels, and the control signal is preferably encoded in a Teletext compatible format transparent to a standard Teletext receiver.

The control signal may comprise a cue signal for transferring information about play lists and an action signal for triggering an insertion of a predefined segment of additional material, and may be encoded into a Hamming coded format.

In some embodiments, the control signal may comprise a clock run in specification, a framing code, a data channel specification, a designation code, a security access code, a format signal, an action signal, a security code, a package identifier, and a magic number.

The method for inserting additional material into a broadcast television signal may also comprise additional steps. Before the additional material can be inserted, it may be necessary to produce or compile a media segment. A scheduled slot is defined in the broadcast television signal; the scheduled slot is allocated for inserting a segment or a block of segments of additional material. The additional media segment is transferred and stored at the remote receiver. The central television station is then notified that the additional media segment has been stored in the remote receiver. The insertion of each media segment is centrally planned by a central control unit. A cue is encoded into broadcast television signal, which is then broadcast to the remote receivers. At the remote receiver, stored additional media segments are inserted into each scheduled slot defined by the cue. The media segments are then broadcast to the broadcast consumers, and then the television signal is rebroadcast to the broadcast consumers. Operating errors, if present, are communicated and logged at the central broadcast station or a monitoring center.

These and other objects and advantages are accomplished by means of a system, apparatus and method with the features described above.

BRIEF DESCRIPTION OF THE DRAWINGS

The features, objects, and advantages of the present invention will become more apparent from the detailed description set forth below when taken in conjunction with the drawings in which reference characters identify correspondingly throughout and wherein.

DETAILED DESCRIPTION OF EMBODIMENTS OF THE INVENTION

Figure 1:
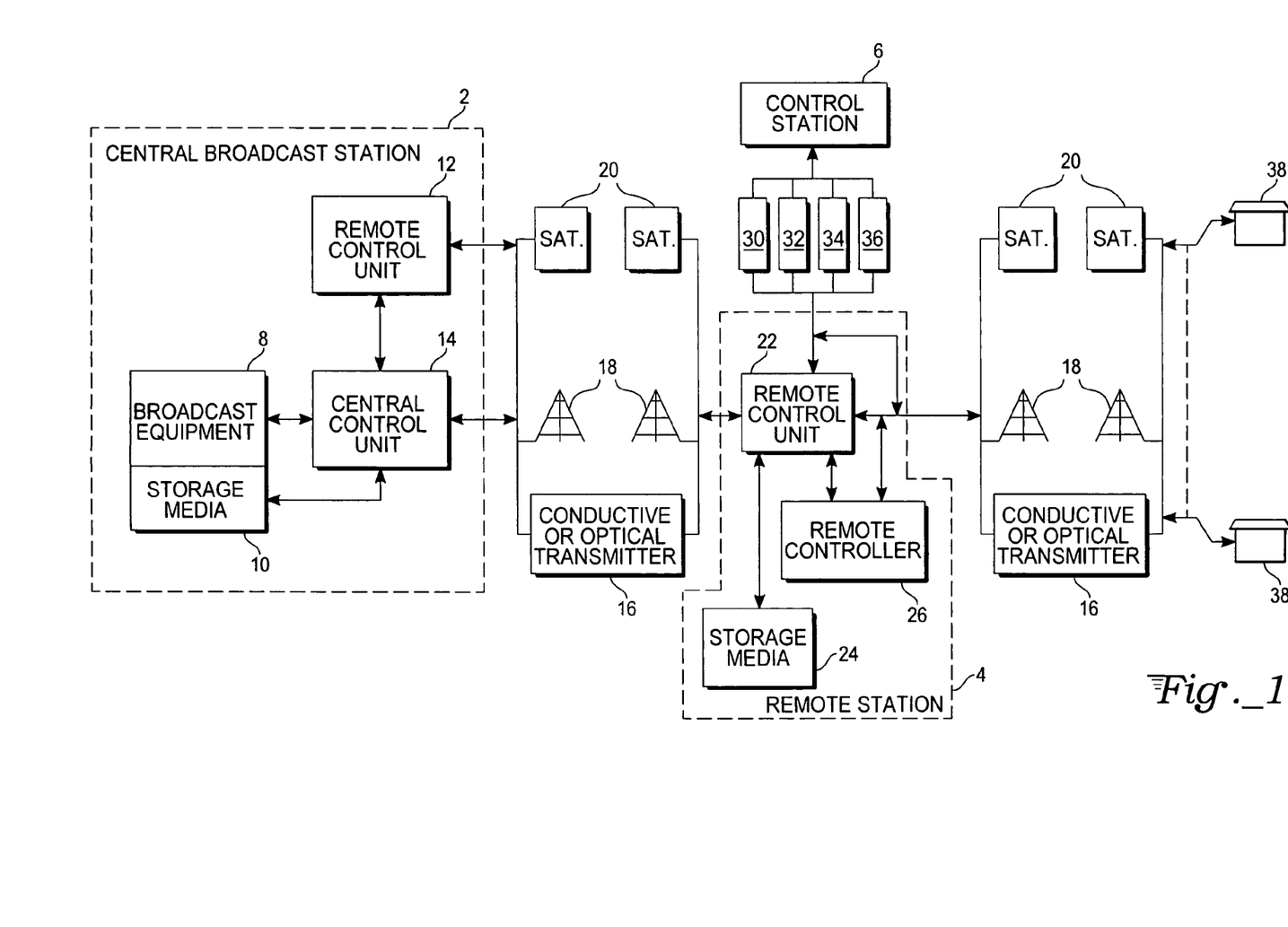
FIG. 1 is an illustration of a broadcast system incorporating the invention and showing a central site and a remote (headend) site of a remote rebroadcast system.

The present invention will now be disclosed with reference to a functional block diagram of an exemplary broadcast system of FIG. 1. It is well understood that such a system of the present design may apply to any audio, video or multimedia broadcast system as is known in the art. Such systems include, but are not limited to, conventional television, digital television, high-definition television ("HDTV"), radio, digital audio radio, or any similar multimedia broadcast system. The invention may also be extended to any compressed or encrypted multimedia broadcast systems without inventive faculty. For illustrative purposes only, an standard television embodiment is described in the detailed description. The example used is only provided to enable any person skilled in the art to make or use the present invention. Thus, the present invention is not intended to be limited to the embodiments shown herein, but is to be accorded the widest scope consistent with the claims herein.

In FIG. 1, the diagram illustrates a broadcast system for local insertion of additional material into a main broadcast signal. A central broadcast station 2 for broadcasting one or several broadcast channels is coupled to one or more remote stations 4 (also known as "headend stations"). This connection to the remote station 4, for the purposes of rebroadcasting a television signal from the central broadcast station 2, can be done in any method known in the art, such as via a conductive or optical transmitter 16, aerials for terrestrial wireless transmission 18, or parabolic aerials 20 for satellite transmission. The remote station 4 is also integrated in a rebroadcast system, thus rebroadcasting the television signal to broadcast consumers 38 using any means known in the art, including: conductive/optical transmitters 16, terrestrial or wireless transmitters 18 or satellite transmitters 20. A remote station 4 may also be connected to a service or control station 6. Such a control station 6 manages the insertion of additional material in predefined slots of the main television signal. This additional material may be of any audio-video material known in the art, such as text, characters, data or control information that may be produced, encoded or compressed, including local commercials in the form of audio and/or video segments. The additional material may be transmitted to the remote station 4, by any means known in the art, including satellite communications 30, telephone/modem communications 32, an Integrated Services Digital Network ("ISDN") 34, and any manual or mechanical conveyance 36 or the audio-video path 16, 18, 20.

Returning to the central broadcast station 2, the central broadcast station 2 is provided with a central control unit 14 for controlling the insertion of additional material. The central control unit 14 is coupled to broadcast equipment 8 for broadcast channels, i.e., one or several main television signals, to storage media 10 for storing a central play list containing information about the main television signal, central commercials and predefined slots for central and local insertion of additional material. The central control unit 14 or any other insertion equipment comprised in or coupled to the broadcast equipment 8 may control central insertion of additional material.

The central broadcast station of FIG. 1 comprises known broadcast equipment 8 coupled to a central control unit 14. Broadcast television signal output from the broadcast equipment 8 is input into the central control unit 14. The central control unit 14 is adapted for controlling the insertion of a media segment. The media segment is a section of information represented, such as audio, video, software, still images, or data signals. Some embodiments of the central control unit 14 have control software, a cueing generator and an optional data communications unit, such as a modem for transmitting and receiving data over a telephone line. Different embodiments of the central control unit are operated by means of menu-driven software using a keyboard, a customized control panel, or by means of an existing automatic control system. The central control unit 14 may also be controlled by a remote control unit 12.

The remote station 4 of FIG. 1 comprises a remote control unit 22 connected to a remote controller 26 and storage media 24. The storage media may be any kind known in the art for storing a local play list, additional material or media segments to be inserted, log files and status information. The remote control unit 22, storage media 24, and remote controller 26 are coupled to a television signal receiver (not shown) and rebroadcast equipment (also not shown). The remote control unit 22 may itself be controlled either through the remote controller 26 or through insertion control signals incorporated in the broadcast television signal received by the remote station 4. It is understood by those in the art that such a described system with the central broadcast station 2 and remote station 4 may use compression and/or decompression hardware or software located at a separate site.

The system described in FIG. 1 is able to insert additional material into a main broadcast signal. Once the media segment is produced or compiled, a scheduled slot is defined. A scheduled slot is a portion of time in a broadcast that can be allocated for insertion of a media segment or a block. A block is defined as a number of consecutive media segments. Media segments can be transmitted with the video signal as data. For analog implementations of the system, for example, VBI lines can be used while the station is broadcasting, or using any number of television lines during the station's downtime. In digital implementations, a data packet, as part of a media segment, can be transmitted in a compressed or uncompressed stream. The media segment is transferred to the remote headend station 4, which saves the segment on the storage media 24. The central broadcast station 2 is then notified of the successful transfer and storage. The central control unit 14 does central planning and controls the insertion of each media segment. A cue is then encoded into the broadcast television signal. When the television signal is broadcast to the remote station 4, the remote station 4 detects the encoded cue within the television signal and inserts the stored media segment in the slot defined by the encoded cue. The media segment is then broadcast to the television consumers 38. It is understood by those in the art that the television signal can be rebroadcast any number of times to the television consumer 38. Preferably, possible operating errors or logging information from the remote station 4 are communicated to a central broadcast station-monitoring center.

One significant advantage of the system described in FIG. 1 is that it allows for additional flexibility over the conventional cueing system. Whereas traditional cueing systems are scheduling dependant, in the present invention the insertion of material is based on the information encoded within the control signal. Consequently, there is no need for the remote station 4 to have knowledge about the schedules. Schedules only have to be held at the central control unit 14 in the normal manner.

For example, in a content-based control signal, the present invention allows the content type of the broadcast to be specified by the central control unit 14. Thus when last minute changes are made, any media segments inserted can be sorted to match the appropriate content type. This automation allows the remote station 4 to accommodate last minute changes, and thus avoid a large amount of communication time and human intervention.

In addition, the control signal may be context-based. In such a signal, the media segments may be inserted based on a demographic group or even a single individual's preferences. For example, in situations where the remote sites 4 are actually in a viewer's home, the advertisements may be based on the viewing and buying habits of a particular individual. In such embodiments of the invention, a feedback channel may send information about the viewing or buying habits of the particular individual to the central control unit 14 so that the appropriate material may be inserted into the viewer's video signal. Such a feedback channel may also be used for security purposes, as will be elaborated further herein.

Figure 2:
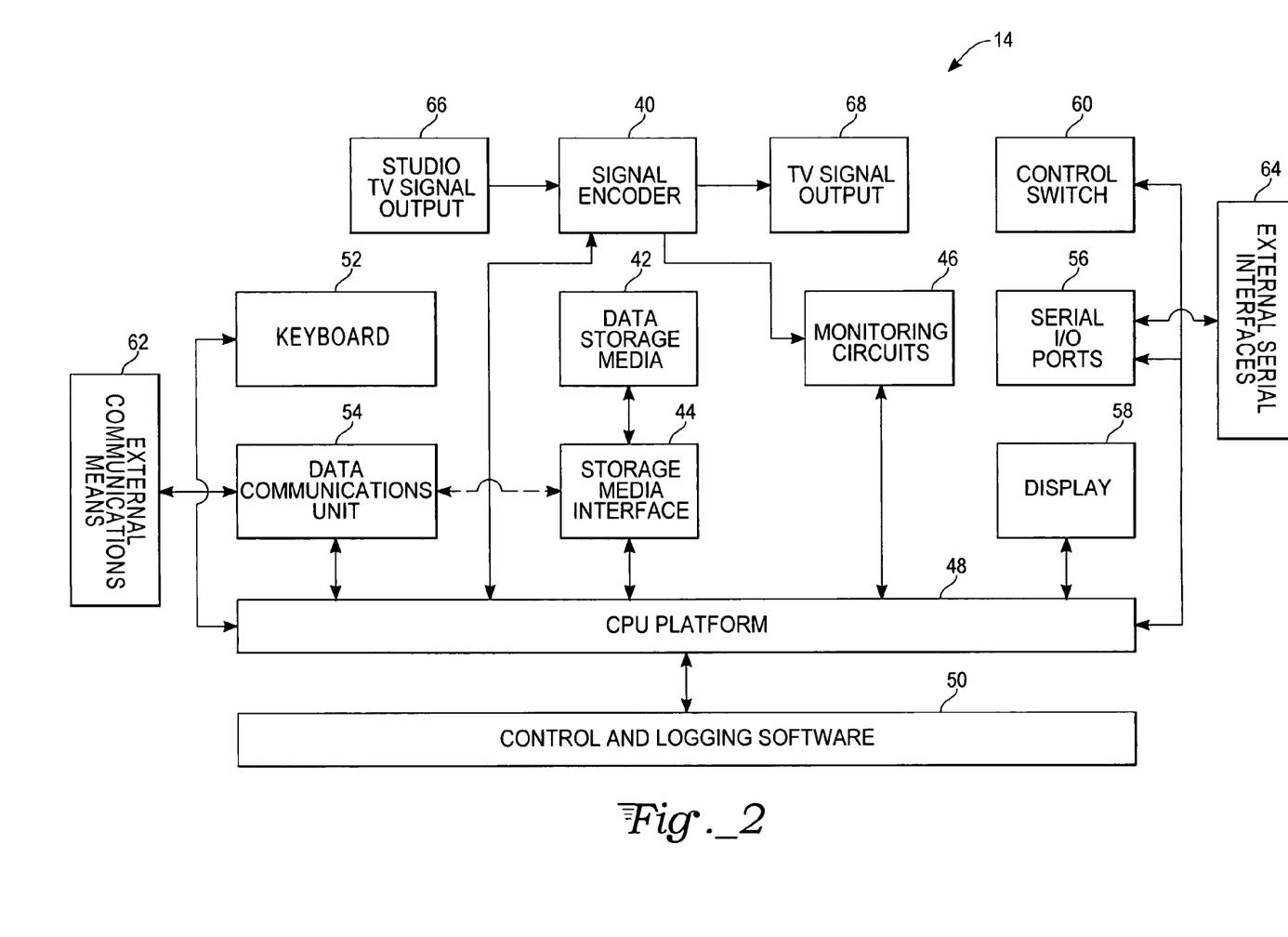
FIG. 2 is a schematic illustration of an embodiment of a central control apparatus provided in a central site according to FIG. 1.

Moving to FIG. 2, FIG. 2 shows an embodiment of a central control unit 14 that schedules the insertion of additional material. Such a central control unit has a central processing unit (CPU) platform 48 running multitasking control and logging software 50. Data storage media 42, of any kind known in the art, such as magnetic or optical disk, is connected to the CPU 48 via a storage media interface 44. Monitoring circuits 46 and a signal encoder 40 are mutually coupled as well as coupled to the CPU 48. The signal encoder may be of any kind known in the art, for example, a Teletext encoder. A conventional studio television signal output 66 is coupled to the signal encoder 40 for encoding insertion control signals into the television signal. After the encoding process, the television signal is fed to an insertion encoded television signal output 68 for conventional broadcasting. Also coupled to the CPU 48 are data communications unit 54 and serial input/output ports 56. The data communications unit 54 may be of any kind known in the art that can transmit or receive data from external communications means 62; examples of a data communications unit is a modem or ISDN equipment. In a preferred embodiment of the invention, the data communications unit 54 also consists of firmware that allows top level control of the tasks associated with media segment spot control and play out. It communicates with a database of media segments, checks and monitors the status of remote units, sends the required media segments at the right time, retrieves log files, and reports errors. It could also communicate with the insertion control to send data with video. The serial input/output ports 56 are connected to external serial interfaces 64. Optionally, a human operator can use the central control unit 14 via an attached keyboard 52, a display 58 or control switch 60 connected to the CPU 48.

For controlling a number of remote control units 4, one embodiment of the present invention operates by using the vertical blanking interval ("VBI") of a television signal as the cue. In an embodiment of the present invention, the method uses only one selectable line of the VBI, and the signals may typically have up to $10^{14}$ different codes with full error checking. The form of the encoded signals used in this method are Teletext compatible but are transparent to standard Teletext receivers. Examples of Teletext compatible formats are well known in the art, and are thus not discussed here. Such control signals are locked to the television signal, and are thus available any time a television signal itself is available.

Other audio or video embodiments of the present invention may use other forms of spare data capacity that are analogous to the vertical blanking interval. In digital environments, this is further abstracted when compressed streams of data are considered, as the relative timing of sent data does not relate directly to its display time. In these types of compressed digital transmission schemes, such as digital audio broadcasts or MPEG, data is classified into types. For example, in a MPEG program typical sub-stream types are: audio, video, system data, and private data. In the transport stream layer commonly used in transmission the data is further packetized and time multiplexed. The control signals are well suited to be transmitted in any of these sub-streams, however, the transmission method should be adapted in such a way that time synchronism is maintained between the control signal and the media data it refers to. When the control signal is transmitted outside of any audio/video sub-stream (e.g. as private data) the explicit use of time references is necessary. This way frame accuracy is preserved. Also, care should be taken to ensure that the control data is transparent to the consumer receivers and set top boxes in an analogous way to the Teletext solution. Methods of insertion of additional or private data into compressed streams are well known in the art.

Figure 6:
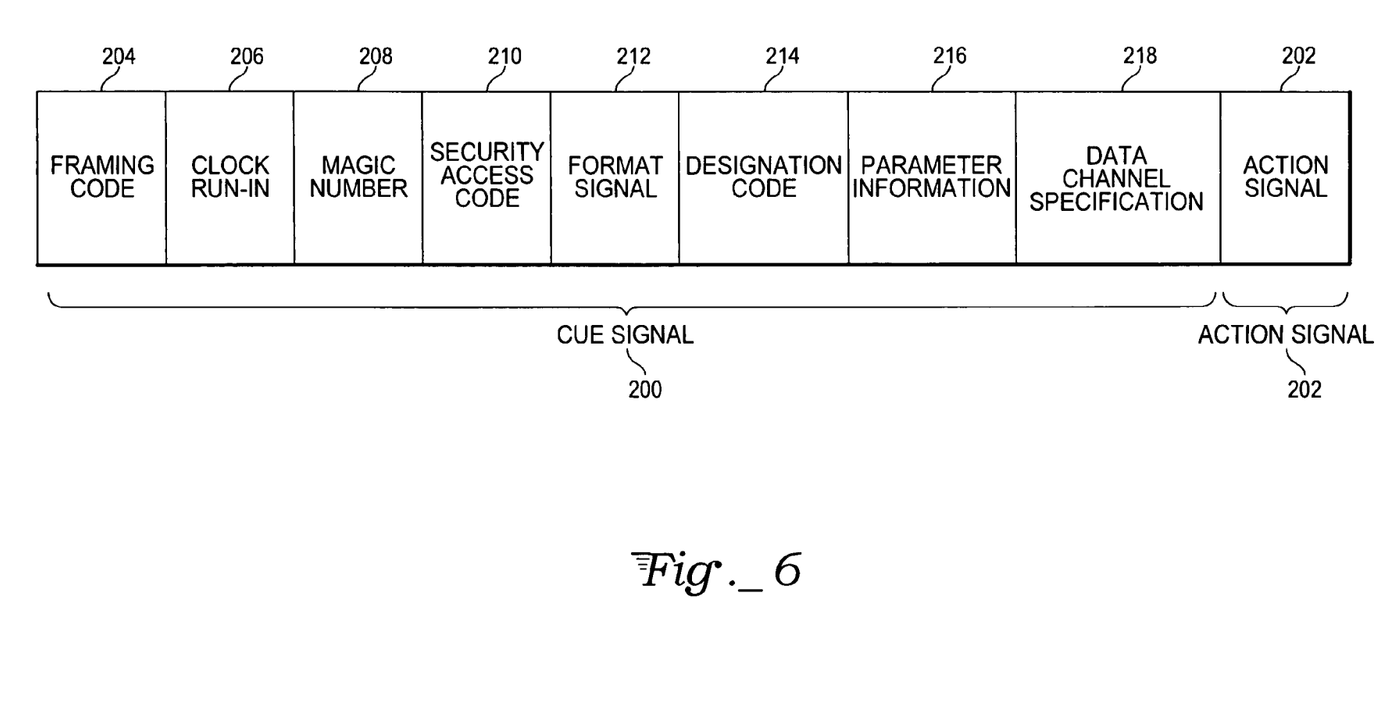
FIG. 6 is an illustration of an embodiment of a control signal of the present invention.

Controlling commands may be transmitted from the central control unit 14 to a remote control unit 22 by any means known in the art, such as very small aperture terminal ("VSAT"), ISDN, or via a modem. In most cases signals being sent in return to the central control unit 14 would be transferred through ISDN or via a modem. In one embodiment, as shown in FIG. 6, control signals used to achieve an insertion comprise a cue signal 200 and an action signal 202. The cueing signal transfers information about play lists for different remote control units 22, while the action signal triggers an insertion of a predefined media segment.

In a preferred embodiment of the VBI transferring method, the control signals are Hamming coded for data security. For example, this data structure can be compatible with the Packet 31 protocol, as defined in the World Standard Teletext (WST). The data structure of control signals may be configured with data comprising: a clock run in specification 206, a framing code 204, a data channel specification 218, a designation code 214, a security access code 210, a format signal 212, an action signal 202, and parameter information 216. Additional modifications to the Packet 31 payload provide additional inherent security features. First, a security code can be used to identify the television channel being used and avoid conflicts when more than one television channel is using the same data channel. Second, a package identifier can be used to identify the proper receipt of the control signal. This is because the package identifier is calculated from the input parameters using an algorithm known only to legitimate central control units 14 and remote stations 4. These input parameters may include the action code, parameter information, the data itself, and the length (as determined by the number of data bytes). Lastly, a "magic number" 208 can be added. A magic number adds additional security and is used in a number of ways. In one embodiment of the present invention, the magic number 208 is required before a media segment can be played. For example, the magic number 208 is transmitted in advance to the remote station 4. This transmission may occur by any means known in the art other than by the video signal. In a preferred embodiment, the magic number 208 is transmitted via a feedback channel. The magic number 208 can then be compared to another magic number 208 stored in the video signal. If the magic numbers 208 match, the media segment will then be played. Alternatively, the magic number 208 may be used as an encryption key for deciphering the data. As the magic number is only known to legitimate central control units 14 and remote stations 4, it prevents video or media piracy of the video signal. In either situation, the magic number can be changed routinely to enhance the security of the system.

It is worthy to further note that because the control signal experiences the same routing as the video signals, the differential delay problems of standard cue tone and relay systems are avoided. Consequently, the invention is frame accurate.

When cued by the control signal, a media segment player initially cues in a block of additional material. The cued block is played or broadcast until completed or terminated by the control signal, then the played block is stopped and held by the media player. In addition, the media player must be able to release a currently played block or cancel a stored block of material.

Figure 3:
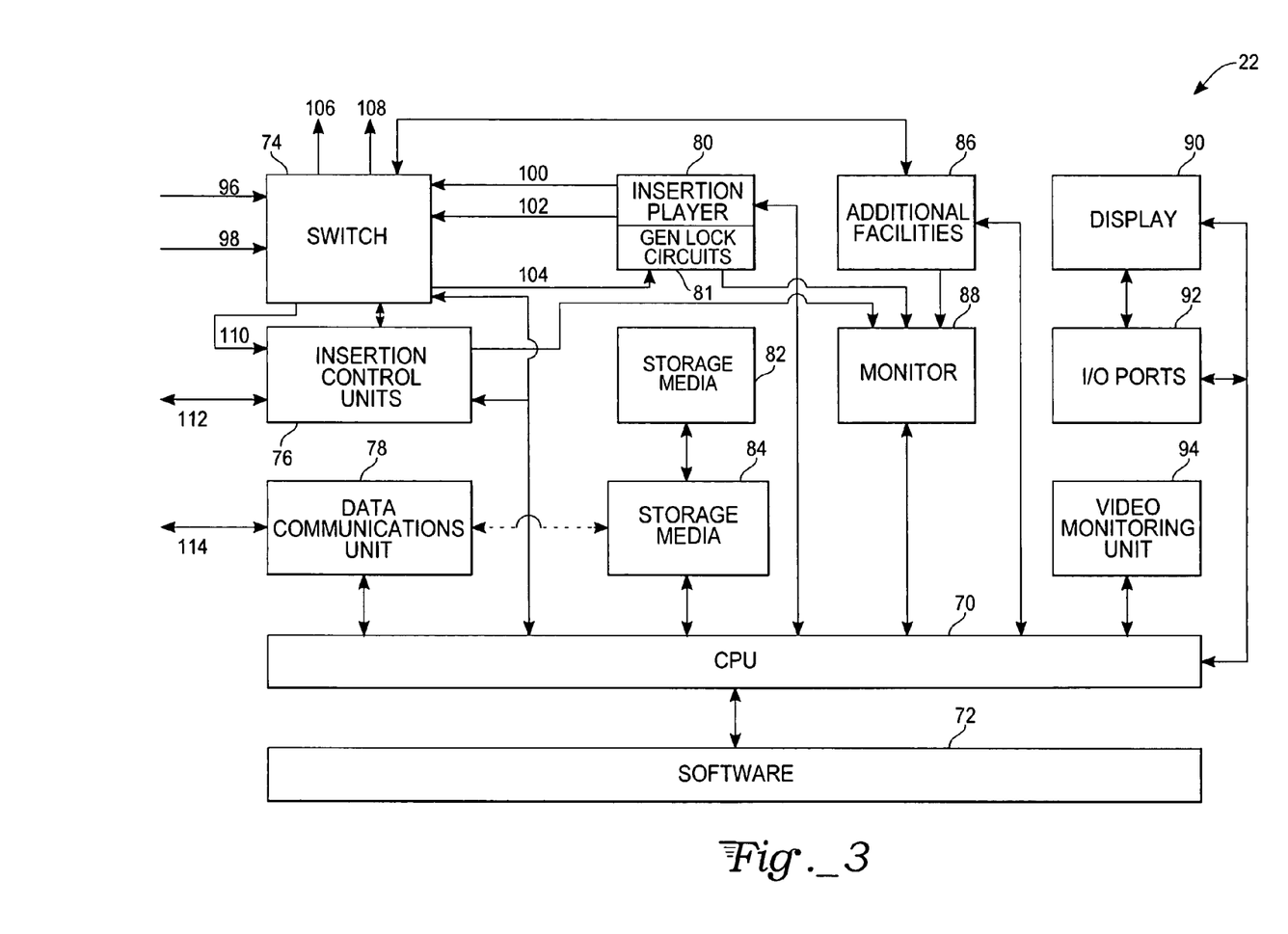
FIG. 3 is a schematic illustration of an embodiment of a remote insertion control apparatus provided in a remote headend site according to FIG. 1.

Moving to FIG. 3, insertion control units 76 must be able to reset selected remote control units 22, as well as being able to set time and date parameters. In addition insertion control units 76 should be able to download current log files to the central control unit 14, and instruct remote control units 22 to listen for their next command. Finally, insertion control units 76 should be able to set the conditions for their operations, for example, determine when they must contact remote control units 26 to verify commands and operations with the central control unit 14.

Data communications units 78 control the transfer and movement of large amounts of data, such as additional material, play lists, and program updates. Therefore, they must be able to initiate and end data transfers, and identify data blocks. Similarly the storage media controllers 84 must be able to identify or confirm the existing files, as well as being able to delete, copy, move, or rename files. In addition, the ability to retrieve a directory of files is important.

The remote control units 22 are configured as multichannel units with the ability of changing input and output channels dynamically. Let us assume for example, that an input channel refers to a monitoring channel, while an output channel is the channel into which additional material is inserted. The remote control unit 22 has an interface both to internal insertion unit and to the external equipment in a rebroadcast station. For monitoring and controlling the external equipment, the remote control unit 22 must be able to: set an input switch for controlling an input channel, set an output switch controlling an output channel, set an analog switch and a relay, set user bits to reflect user status, and read monitor bits showing the status of the remote station equipment.

Command parameters used in connection with the control signals should contain a timestamp and a play list identity. An example of the control signal could include: year, month, day of month, hour, minute, second and block number of the additional material. Timestamps sent at regular intervals, for example once a second, can be used by the central insertion control unit 14 to synchronize remote stations 4. Furthermore, it allows remote stations 4 to be monitored locally and remotely without having to wait for an insertion event.

In FIG. 3, an embodiment of a remote control unit 22 is shown. The remote control unit 22 contains an insertion control unit 76 coupled to a television signal switch 74. The insertion control unit 76 is connected to an input/output port 112 for communicating external control and monitoring signals. The television signal switch 74 is connected to an analog or digital signal insertion recorder/player unit 80. The insertion player 80 is comprised of genlock circuits 81 and circuits able to compress/decompress or pass data with a known video standard. Exemplary standards include the Motion Pictures Expert Group-2 ("MPEG-2") or Joint Photographic Experts Group ("JPEG") standards. The switch 74 is adapted to change to a broadcast television output in case of system failure. The insertion control unit 76, television signal switch 74, and insertion recorder/player unit 80 are controlled by a central processing unit (CPU) platform 70. The CPU platform runs multitasking control and logging software 72. A remote control unit 22 may be configured to be able to handle several different incoming television signals for different broadcast channels.

In operation, a television signal comprising a video signal 96 and an audio signal 98 is input into the signal switch 74. A connection 110 conveys the video signal to the insertion control unit 76, while a genlock video signal 104 is conveyed to the genlock circuits of the insertion signal player 80. An insertion video signal 100 and an insertion audio signal 102, genlocked with the original television signal, are transferred to the signal switch 74. The received broadcast television signals 96 and 98 are rebroadcast through video output 106 and audio output 108. In response to a cue, the signal switch 74 switches over to rebroadcast the inserted audio/video signals 100, 102 for predefined time interval. The cue may be transmitted together with the television signal 96 or 98, In alternate embodiments of the invention, the remote control unit 22 may also comprise storage media 82, a storage media interface 84, a data communications unit 78, a monitor 88, additional facilities 86, serial input/output ports 92 and a display 90 or video monitoring unit 94. All these devices would be connected to the CPU. The storage media 82 could be any kind known in the art, for example a magnetic or optical storage device. The data communications unit 78 is connected to external communications 114, and thus could be a modem, ISDN, VSAT or any other data communications unit known in the art. The monitoring unit allows a user to track the status of the analog/digital insertion signal unit 80, while the additional facilities 86 could be a local Teletext terminal device.

Figure 4:
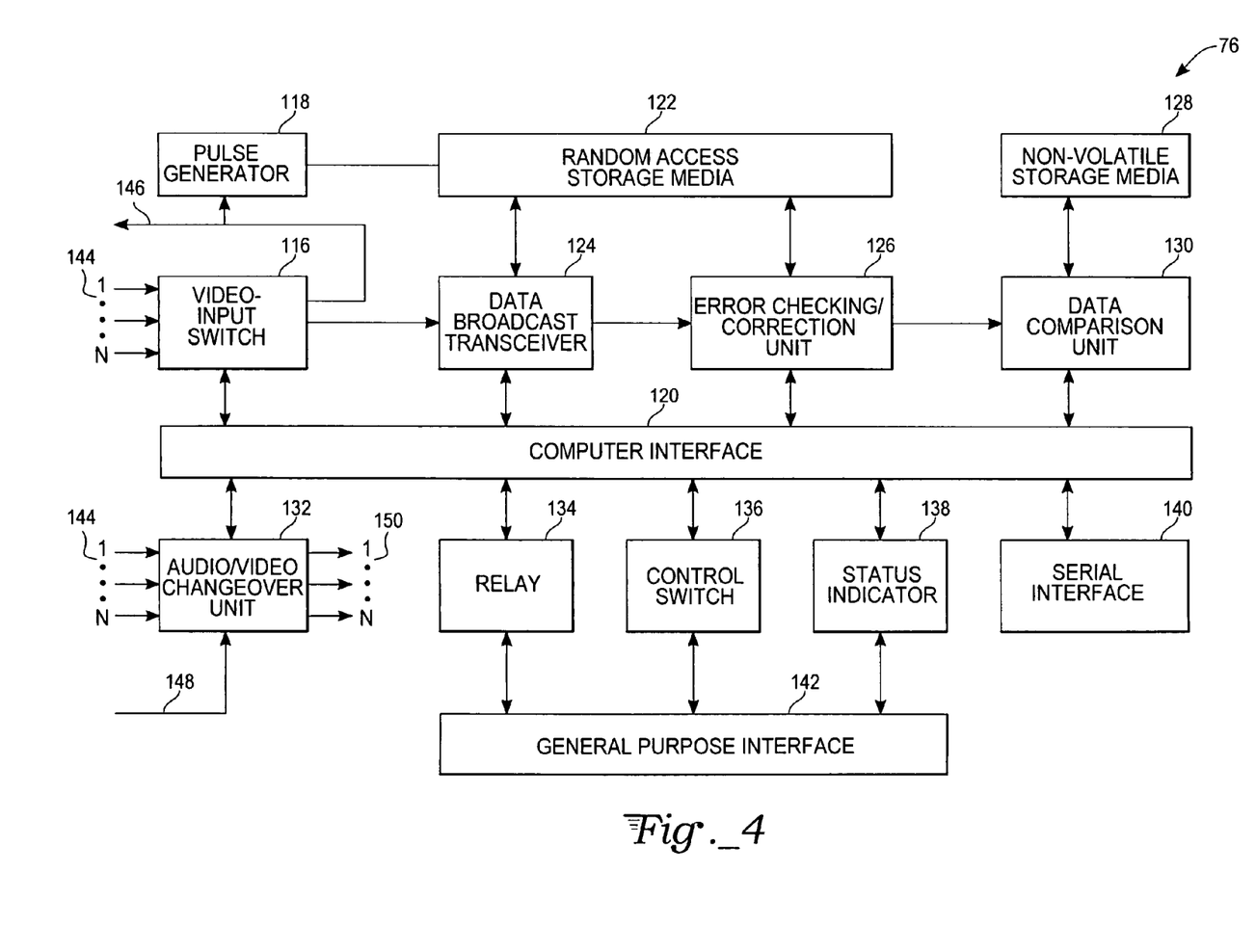
FIG. 4 is a schematic illustration of an embodiment of a cue in apparatus comprised in a remote insertion control unit according to FIG. 3.

Moving to FIG. 4, an embodiment of the insertion control unit 76 is shown. Here the insertion control unit 76 has a computer interface 120 comprising address decoding circuits, interrupt control circuits and read/write circuits. The computer interface 120 allows the connected computer processor 70 to communicate with units coupled to the interface 120. An embodiment of the computer interface 120 is implemented by means of generic array logic ("GALs") and part of a field programmable gate array ("FPGA"). The insertion control unit 76 further comprises a video-input switch 116 for selecting, from a number 1-N of received input signals/channels 144, a signal in which data should be encoded. The video input, connected to a computer 70 (FIG. 3), may control the switch 116 or follow instructions of control data received through any other communications device. The main purpose of the switch is to allow a number of channels to be monitored without duplicating receiver and decoding means in the remote station.

In another embodiment of the invention, different VBI lines may be allocated to different broadcast channels, so that each broadcast channel can be sampled at least once a frame. In that case, the channels would normally have to be sync locked together.

A video output 146 is used for genlocking the insertion material recorder and player 80 and other devices of the system. The video output 146 is also input into a pulse generator 118 for generating pulses from the selected video signal. These pulses are then transmitted to and used by other functional units comprised in the system. For example, the pulses can be used for synchronizing and blanking signals.

A data broadcast transceiver 124, possibly implemented in an FPGA, is coupled to the computer interface 120, a random access data storage media 122 and an error checking/correction unit 126. The data broadcast transceiver 124 is preferably a Teletext broadcast receiver, but may be of any kind known in the art. As has been explained above, initially, control data is transmitted using a line of the VBI. The control data may be in a Teletext compatible format, and may be used by the system as an independent data channel. Other functional data, for example: cueing, playing, logging, cross-checking and play list information, is transmitted in a Hamming coded data format. The receiver 124 extracts data from the video signal and validates the initial data for correctness. If valid data is detected, the additional information is sent to the error checking/correction unit 126 for checking and possible correction. Once validated, the data is stored on the storage media 122. The receiver 124 controls the storage of received data on the storage media 122.

An audio/video changeover unit 132 is used for switching from rebroadcasting a received television/channel signal 144 to an insertion signal 148 from an insertion material player. The audio/video changeover unit 132 is coupled to the computer interface 120.

The insertion control unit 76 may further be provided with a data comparison unit 130 coupled to a non-volatile storage media 128. The non-volatile storage media 128 may be preloaded with a block of data from the CPU 70, allowing a real time comparison with the decoded data as it is received.

To achieve integration of insertion control units 76 into existing rebroadcast systems and controlling external devices, embodiments of the insertion control unit 76 may be provided with one or several relays 134, control switches 136 and status indicators 138. The relays 134 turn on and off various devices in the system. The relays 134, control switches 136 and status indicators 138 are coupled to the computer interface 120 and to a general purpose interface 142. For added flexibility, a serial interface 140, such as an RS-232 port, may also be coupled to the computer interface 120.

Figure 5:
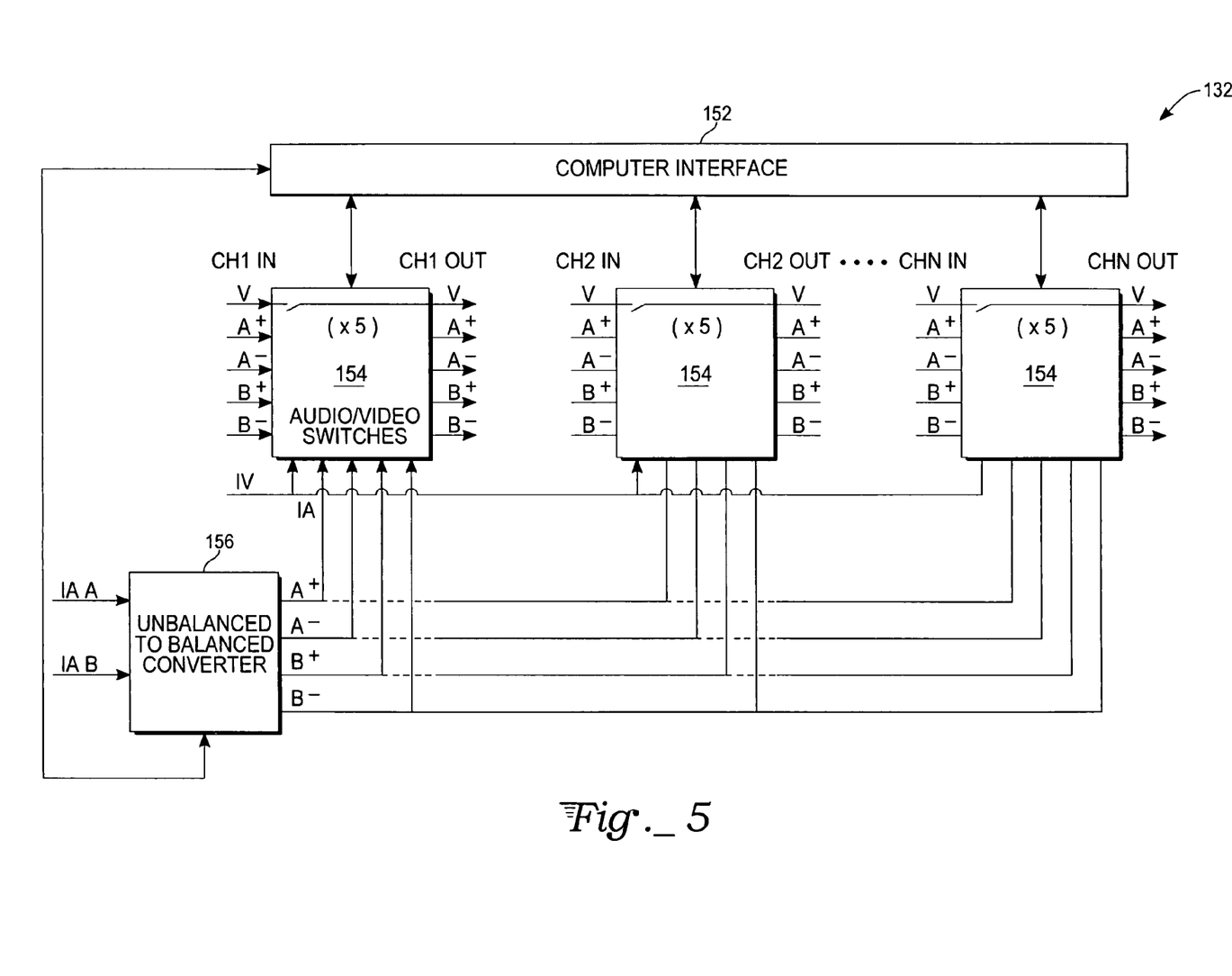
FIG. 5 is a schematic illustration of an embodiment of a signal changeover comprised in an embodiment of a cue in apparatus according to FIG. 4.

An embodiment of an audio/video changeover unit 132 is shown in FIG. 5. The audio/video changeover unit 132 comprises: a computer interface 152, a number of signal routes, audio/video switches 154, and an unbalanced to balanced converter 156. In this example five signal routes are shown. It is well understood that any number of signal routes may exist, depending upon the needs of the application at hand. The audio/video switches 154 and the unbalanced to balanced converter 156 are coupled to the computer interface 152. The audio/video switches 154 allow insertion of additional material signals. The additional material signals include an insertion video signal (IV), first channel insertion audio signal A (IA A) and second channel insertion signal B (IA B) into a number N broadcast channels. The insertion is controllable by means of a CPU 70 or directly from integrated Teletext control signal or command detection. As mentioned above, insertion audio signals from an insertion material player is input in two channels A and B, which may be stereo or two different languages. In order to maintain normal broadcast quality, balanced or differential audio signals are generated in the changeover unit 156 by means of a comprised converter; signals A+, A−, B+, B− are output and transmitted to the audio/video switches 154. The audio/video switches are each provided with one video switch and four audio switches, which change simultaneously from the input broadcast channel signals V, A+, A−, B+, B− to the corresponding insertion signals IV, IB and IA signals in response to insertion control signals. The changeover unit 132 is preferably provided with a real time switch for separately switching the video signals in order to allow centrally broadcast vertical interval data to pass through unchanged. The default condition is for all switches to pass their respective broadcast channel signals unchanged.

The insertion control unit 76 may further be provided with a data compare unit 130 coupled to a non-volatile storage media 128. The non-volatile storage media 128 may be preloaded with a block of data from the CPU 70, thus allowing a real time comparison with the decoded data as it is received.

Couplings and signal transmitting routes between functional units of the inventive system are apparent from the drawings.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A system for frame accurate insertion of a media segment into a broadcast signal, comprising:
   a central insertion control unit, capable of inserting the media segment into a broadcast signal, that inserts a control signal related to the media segment and an information signal into the broadcast signal, the central insertion control unit being coupled to a central source broadcast equipment; and
   a remote insertion control unit that controls the insertion of the media segment based on the control signal received from the central insertion control unit, the remote insertion control unit being coupled to a rebroadcasting equipment of a remote receiver, the remote receiver detecting the control signal and information signal in a received broadcast signal and broadcasting the media segment in response to the control signal;

wherein the control signal is inserted into the broadcast signal after confirmation is received that the media segment was transferred to and stored at a remote station and comprises:

a cue signal that transfers information about media segments; and an action signal that triggers an insertion of the media segment.

2. The system of claim 1 wherein the central insertion control unit inserts the control signal into spare data capacity of the broadcast signal.

3. The system of claim 2 wherein the action signal references time.

4. The system of claim 2, the control signals further comprising:

a security code identifying the channel to be used by the broadcast signal.

5. The system of claim 4, the control signals further comprising:

a package identifier used to identify the proper receipt of the control signal by the remote insertion control unit.

6. The system of claim 5, the control signals further comprising:

an encryption key used to decipher the media segments.

7. The system of claim 5 wherein the central insertion control unit comprises:

storage media for storing control information as well as media segment information and logging information;

a processor for controlling and monitoring the insertion and being coupled to the storage media;

an encoder for encoding control signals and information signals into a broadcast signal, the encoder being coupled to the processor; and a data communications unit for external communication and serial interface for connection to external devices, the data communications unit and the serial interface being coupled to the processor.

8. The system of claim 7 further comprising:

a first remote control unit coupled to the central insertion control unit for remotely controlling and communicating with the central insertion control unit;

a second remote control unit coupled to the remote insertion control unit for remotely controlling and communicating with the remote insertion control unit; wherein communication with the first remote control unit and the central insertion control unit is devised to be performable by telecommunications lines.

9. The system of claim 5 wherein the remote insertion control unit comprises:

a processor;

storage media for storing media segment and being coupled to the processor;

a player for playing stored media segment and being coupled to the processor and the storage media;

a broadcast signal switch for switching between broadcasting received broadcast signals and media segment being played by the player, the media segment being input into the switch as broadcast signals;

an insertion control unit being coupled to and devised for controlling the switch, the insertion control unit having an input for receiving the video signal portion of a broadcast video signal, from which a control signal is extractable;

a computer interface being connectable to the processor;

a data broadcast transceiver being coupled to the computer interface; and an audio-video changeover for switching from a received broadcast signal output to an insertion signal output from the player, the audio-video changeover being coupled to the computer interface.

10. The system of claim 9 further comprising:

a first remote control unit coupled to the central insertion control unit for remotely controlling and communicating with the central insertion control unit;

a second remote control unit coupled to the remote insertion control unit for remotely controlling and communicating with the remote control unit; wherein communication with the first and second remote control units and the insertion control units is performed by telecommunications lines.

11. The system of claim 10 wherein the action signal triggers an insertion of the media segment based on the content of the media segment.

12. The system of claim 10 wherein the action signal triggers an insertion of the media segment based on the context of the media segment.

13. The system of claim 5 wherein the context of the media segment is conveyed to the remote insertion control unit via a feedback channel from an end receiver of the broadcast channel.

14. The system of claim 10, wherein the action signal triggers an insertion of the media segment in response to central playing schedule information.

15. The system of claim 14, wherein the remote insertion control unit is coupled to remote storage media for storing media segments, play lists, log files and status information.

16. The system of claim 15, wherein the central insertion control unit and a remote insertion control unit are connectable into a network by the telecommunications lines.

17. The system of claim 15, wherein the central insertion control unit, the remote insertion control unit and a separately located compression/decompression unit for compressing/decompressing information are connectable into a network by the telecommunications lines.

18. The system of claim 17, wherein the control signal encoder is encoded into a Teletext compatible format.

19. The system of claim 18, wherein the control signal encoder is encoded into a Teletext compatible format transparent to a standard Teletext receiver.

20. The system of claim 18, wherein the control signal encoder is encoded into a Hamming coded format.

21. The system of claim 17 wherein the broadcast signal is a radio signal.

22. The system of claim 21 wherein the radio signal is digital.

23. The system of claim 17 wherein the broadcast signal is a television signal.

24. The system of claim 23 wherein the spare capacity of the broadcast signal is a vertical blanking interval.

25. The system of claim 23 wherein the broadcast signal is a high definition television signal.

26. A central insertion control apparatus for frame accurate insertion of a media segment into a broadcast signal, comprising:

storage media for storing control information, media segment information, and logging information;

a processor for controlling and monitoring the insertion and being coupled to the storage media;

a data communications unit for external communication;

a serial interface for connection to external devices, wherein the data communications unit and the serial interface are coupled to the processor; and, an encoder, coupled to the processor, for encoding control signals related to the media segment and information signals into a broadcast signal, the control signals encoded into the broadcast signal after confirmation is received that the media segment was transferred to and stored at a remote station and comprising:

a cue signal that transfers information about media segments; and an action signal that triggers an insertion of the media segment.

27. The apparatus of claim 26 wherein the central insertion control unit inserts the control signal into spare data capacity of the broadcast signal.

28. The apparatus of claim 27 wherein the action signal references time.

29. The apparatus of claim 27, the control signals further comprising:

a security code identifying the channel to be used by the broadcast signal.

30. The apparatus of claim 29, the control signals further comprising:

a package identifier used to identify the proper receipt of the control signal by a remote insertion control unit.

31. The apparatus of claim 30, the control signals further comprising:

an encryption key used to decipher the media segments.

32. The apparatus of claim 30 wherein the action signal triggers an insertion of the media segment based on the content of the media segment.

33. The apparatus of claim 30 wherein the action signal triggers an insertion of the media segment based on the context of the media segment.

34. The apparatus of claim 33 wherein the context of the media segment is conveyed to the remote insertion control unit via a feedback channel from an end receiver of the broadcast channel.

35. The apparatus of claim 30, wherein the action signal triggers an insertion of the media segment based in response to central playing schedule information.

36. The apparatus of claim 30, wherein the encoder is a Teletext encoder for encoding the control signal into a Teletext compatible format.

37. The apparatus of claim 36, wherein the Teletext encoder encodes the control signal into a Teletext compatible format transparent to a standard Teletext receiver.

38. The apparatus of claim 30, wherein the control signals further comprise a cue signal for transferring information about play lists and an action signal for triggering an insertion of a predefined segment of a media segment.

39. The apparatus of claim 38, wherein the control signals are coded in a Hamming coded format.

40. The apparatus of claim 39, wherein the spare data capacity is a vertical blanking interval.

41. The apparatus of claim 30, further comprising:

a data communications unit for external communication; and a serial interface for connection to external devices, wherein the data communications unit and the serial interface are coupled to the processor.

42. The apparatus of claim 30, characterized by transferring control signals in the form of controlling commands from the central insertion control apparatus through a telecommunications line.

43. The apparatus of claim 42, wherein the telecommunications line is a very small aperture terminal line.

44. The apparatus of claim 42, wherein the telecommunications line is an integrated services digital network line.

45. The apparatus of claim 42, wherein the telecommunications line is a telephone or modem line.

46. A remote insertion control apparatus for frame accurate insertion of a media segment into a broadcast signal comprising:

a processor;

storage media for storing the media segment and being coupled to the processor;

a player for playing the stored media segment and being coupled to the processor and the storage media;

a broadcast signal switch for switching between broadcasting received broadcast signals and media segments being played by the player, the media segment being input into the broadcast signal switch as broadcast signals; and an insertion control unit for controlling the broadcast signal switch, the insertion control unit having an input for receiving from a central broadcast station the video signal portion of a broadcast video signal, from which a control signal is extractable, the control signal related to the media segment received after confirming the media segment has been stored; wherein the control signal comprises:

a cue signal that transfers information about media segments; and, an action signal that triggers an insertion of the media segment.

47. The apparatus of claim 46 wherein the central insertion control unit inserts the control signal into spare data capacity of the broadcast signal.

48. The apparatus of claim 47 wherein the action signal references time.

49. The apparatus of claim 47, the control signals further comprising:

a security code identifying the channel to be used by the broadcast signal.

50. The apparatus of claim 49, the control signals further comprising:

a package identifier used to identify the proper receipt of the control signal by a remote insertion control unit.

51. The apparatus of claim 50, the control signals further comprising:

an encryption key used to decipher the media segments.

52. The apparatus of claim 50 wherein the action signal triggers an insertion of the media segment based on the content of the media segment.

53. The apparatus of claim 50 wherein the action signal triggers an insertion of the media segment based on the context of the media segment.

54. The apparatus of claim 53 wherein the context of the media segment is conveyed to the remote insertion control unit via a feedback channel from an end receiver of the broadcast channel.

55. The apparatus of claim 50, wherein the action signal triggers an insertion of the media segment in response to central playing schedule information.

56. The apparatus of claim 50, wherein the encoder is a Teletext encoder for encoding the control signal into a Teletext compatible format.

57. The apparatus of claim 56, wherein the Teletext encoder encodes the control signal into a Teletext compatible format transparent to a standard Teletext receiver.

58. The apparatus of claim 50, wherein the control signals further comprise a cue signal for transferring information about play lists and an action signal for triggering an insertion of a predefined segment of a media segment.

59. The apparatus of claim 58, wherein the control signals are coded a Hamming coded format.

60. The apparatus of claim 59, wherein the spare data capacity is a vertical blanking interval.

61. The apparatus of claim 50, wherein the insertion control unit comprises:
   a computer interface being connectable to the processor;
   a data broadcast transceiver being coupled to the computer interface; and
   an audio/video changeover for switching from a received broadcast signal output to an insertion signal output from the player, the changeover being coupled to the computer interface.

62. The apparatus of claim 61, further comprising:
   genlocking circuits having an input for receiving a broadcast video signal and being coupled to the player for genlocking its output signal to the received video signal.

63. A method for frame accurate insertion of a media segment into a broadcast signal being broadcast from a central source and received by a remote receiver adapted for rebroadcasting the broadcast signals to a number of end user units, comprising:
   encoding control signals and information signals into a broadcast signal, wherein the control signals are comprised of a cue signal that transfers information about media segments and, an action signal that triggers an insertion of the media segment, wherein a control signal related to a media segment is encoded after confirmation is received that the media segment was transferred to and stored at the remote receiver; and
   inserting the control signals into spare data capacity of the broadcast signal.

64. The method of claim 63 wherein the action signal references time.

65. The method of claim 63, wherein the control signals further comprise:
   a security code identifying the channel to be used by the broadcast signal.

66. The method of claim 65, wherein the control signals further comprise:
   a package identifier used to identify the proper receipt of the control signal by a remote insertion control unit.

67. The method of claim 66, wherein the control signals further comprise:
   an encryption key used to decipher the media segments.

68. The method of claim 66, wherein the action signal triggers the insertion of the media segment based on the content of the media segment.

69. The method of claim 66 wherein the action signal triggers the insertion of the media segment based on the context of the media segment.

70. The method of claim 69 wherein the context of the media segment is conveyed to the remote insertion control unit via a feedback channel from an end user unit of the broadcast channel.

71. The method of claim 66, wherein the action signal triggers an insertion of the media segment in response to central playing schedule information.

72. The method of claim 66, wherein the encoder is a Teletext encoder for encoding the control signal into a Teletext compatible format.

73. The method of claim 72, wherein the Teletext encoder encodes the control signal into a Teletext compatible format transparent to a standard Teletext receiver.

74. The method of claim 66, wherein the control signals further comprise a cue signal for transferring information about play lists and an action signal for triggering an insertion of a predefined segment of a media segment.

75. The method of claim 74, wherein the control signals are coded in a Hamming coded format.

76. The method of claim 75, wherein the spare data capacity is a vertical blanking interval.

77. The method for insertion of a media segment into a broadcast signal as recited in claim 76, comprising the further step of:
   allocating different vertical blanking interval lines to different broadcast channels.

78. The method for insertion of a media segment into a broadcast signal as recited in claim 76, comprising the further step of:
   transferring the control signals in the form of controlling commands from the insertion control apparatus through a telecommunications line.

79. A method for insertion of a media segment into a broadcast signal as recited in claim 76, further comprising the step of:
   selecting a line of the vertical blanking interval for the insertion of the control signals.

80. The method for insertion of a media segment into a broadcast signal as recited in claim 79, comprising the further steps of:
   producing or compiling media segment;
   defining a scheduled slot in the broadcast signal, the scheduled slot that can be allocated for insertion of a segment or a block of segments of a media segment;
   transferring the additional media segment to and storing it in the remote receiver:
   notifying a central broadcast station that the additional media segment has been stored in the remote receiver;
   centrally planning and controlling the insertion of each media segment by the central control unit;
   encoding the cue in signal into the broadcast signal;
   broadcasting the television signal comprising the cue in signal to the remote receivers;
   inserting, at the remote receiver, in response to the encoded cue in signal, the stored additional media segment in the defined scheduled slot;
   broadcasting the media segment to broadcast consumers;
   rebroadcasting the television signal to broadcast consumers;
   communicating possible operating errors and/or logging information from remote receiver to central broadcast station or a monitoring center.

* * * * *